United States Patent [19]
Suzuki et al.

[11] Patent Number: 5,651,509
[45] Date of Patent: Jul. 29, 1997

[54] RECORDING/REPRODUCING DEVICE

[75] Inventors: Kazuyoshi Suzuki, Tokyo; Takashi Sawada, Kanagawa, both of Japan

[73] Assignee: Sony Corporation, Tokyo, Japan

[21] Appl. No.: 403,941

[22] Filed: Mar. 14, 1995

[30] Foreign Application Priority Data

Mar. 15, 1994 [JP] Japan .................... 6-068932

[51] Int. Cl.$^6$ ................................. G11B 15/04
[52] U.S. Cl. ...................................... 242/338.4
[58] Field of Search .................... 242/338, 338.1, 242/338.3, 338.4, 341, 343, 344, 347; 360/93, 94, 96.5, 96.6, 132

[56] References Cited

U.S. PATENT DOCUMENTS

| | | | |
|---|---|---|---|
| 3,601,558 | 8/1971 | Sugaya et al. | 242/344 |
| 3,619,625 | 11/1971 | Wood | 242/344 |
| 3,977,625 | 8/1976 | Maxwell, Jr. et al. | 242/338.4 |
| 4,607,303 | 8/1986 | Cybulski | 360/132 |
| 4,743,984 | 5/1988 | Ryan | 360/132 |
| 4,993,661 | 2/1991 | Tollefson | 360/132 |
| 5,224,005 | 6/1993 | Fujii | 242/338.3 |
| 5,253,136 | 10/1993 | Suzuki et al. | 360/132 |
| 5,316,236 | 5/1994 | Hasegawa et al. | 242/342 |
| 5,331,482 | 7/1994 | Takasaki et al. | 360/85 |
| 5,390,870 | 2/1995 | Sawada et al. | 242/344 |

FOREIGN PATENT DOCUMENTS 6-195937   7/1994   Japan .................... 360/132

Primary Examiner—John P. Darling
Attorney, Agent, or Firm—William S. Frommer; Alvin Sinderbrand

[57] ABSTRACT

A recording/reproducing device including a cassette holder for holding a tape cassette and moving it to a cassette loading position; a positioning pin adapted to be inserted into a positioning hole formed in the tape cassette, for finally positioning the tape cassette; and a second positioning member for approximately positioning the tape cassette during movement of the tape cassette to the cassette loading position prior to final positioning by the positioning pin. The second positioning member includes a body portion and a guide portion formed at an upper end of the body portion. The body portion has substantially the same shape as that of an opening portion formed at a given position on a lower surface of the tape cassette or an end portion of the lower surface of the tape cassette. Before an upper end of the positioning pin enters a lower end of the positioning hole, the guide portion of the second positioning member comes into contact with the opening portion or the end portion of the lower surface of the tape cassette to approximately position the tape cassette with a side surface of the body portion of the second positioning member. Accordingly, the tape cassette can be securely loaded to the cassette loading position.

14 Claims, 16 Drawing Sheets

RECORDING/REPRODUCING DEVICE

BACKGROUND OF THE INVENTION

1. Field of the Invention

The present invention relates to a recording/reproducing device, and more particularly to a recording/reproducing device which can securely load a tape cassette to a given cassette loading position.

2. Description of the Related Art

In a recording/reproducing device using a tape cassette having a cassette case, tape reels rotatably provided in the cassette case, and a tape as a recording medium wound around the tape reels, the tape cassette is positioned in the recording/reproducing device by engaging positioning pins provided in the recording/reproducing device with positioning pins formed in the tape cassette.

Conventionally, until the positioning holes start engaging with the positioning pins, the tape cassette is positioned only by a cassette holder for holding the tape cassette and moving it to a given cassette loading position. The related art of the present invention is known from U.S. Pat. No. 5,316,236 and European Patent Laid-open No. 0,572,925 (corresponding to U.S. patent application Ser. No. 67,811, filed May 27, 1993, now issues as U.S. Pat. No. 5,390,870 to the present applicant.

However, in the recording/reproducing device as mentioned above, until the positioning holes of the tape cassette start engaging with the positioning pins, a position error of the tape cassette decided in the cassette holder is large. In such a specification that the position error of the tape cassette permitted until it is loaded to the given cassette loading position is small, it is difficult to design a recording/reproducing device meeting this specification.

In particular, while there is a tendency to reduce the size of the tape cassette at present, the size of a device such as LED itself is not reduced. Accordingly, the clearance between each positioning hole and its corresponding positioning pin must be increasingly reduced, and the difficulty of designing of the recording/reproducing device becomes remarkable.

Further, known is another type of recording/reproducing device allowing selective loading of two different-sized tape cassettes wherein the space between a supply reel and a take-up reel for winding a tape is different. In this recording/reproducing device, two reel tables adapted to individually engage with the supply reel and the take-up reel are moved to positions corresponding to the two reels of each of the different-sized tape cassettes. Accordingly, the positioning of each tape cassette in the cassette holder is more difficult than that in a recording/reproducing device using a single-sized tape cassette.

SUMMARY OF THE INVENTION

It is accordingly an object of the present invention to provide a recording/reproducing device which can secure the loading of a tape cassette to a given cassette loading position.

According to the present invention, there is provided a recording/reproducing device comprising a cassette holder for holding a tape cassette and moving it to a cassette loading position; first positioning means adapted to be inserted into a positioning hole formed in the tape cassette, for finally positioning the tape cassette; and second positioning means for approximately positioning the tape cassette during movement of the tape cassette to the cassette loading position prior to final positioning by the first positioning means, the second positioning means including a body portion and a guide portion formed at an upper end of the body portion, the body portion having substantially the same shape as that of an opening portion formed at a given position on a lower surface of the tape cassette or an end portion of the lower surface of the tape cassette; wherein before an upper end of the first positioning means enters a lower end of the positioning hole, the guide portion of the second positioning means comes into contact with the opening portion or the end portion of the lower surface of the tape cassette to approximately position the tape cassette with a side surface of the body portion of the second positioning means.

In the recording/reproducing device according to the present invention, before the tape cassette is loaded to the given cassette loading position, preliminary positioning of the tape cassette in the cassette holder is performed by the second positioning means, thereby allowing the first positioning means to be securely engaged with the positioning hole of the tape cassette.

Accordingly, even when the size reduction of the tape cassette is promoted, fine positioning of the tape cassette can be effected by stepwise performing the positioning of the tape cassette, thus readily coping with any strict formats in a specification to be required.

Other objects and features of the invention will be more fully understood from the following detailed description and appended claims when taken with the accompanying drawings.

DETAILED DESCRIPTION OF THE PREFERRED EMBODIMENTS

Figure 1:
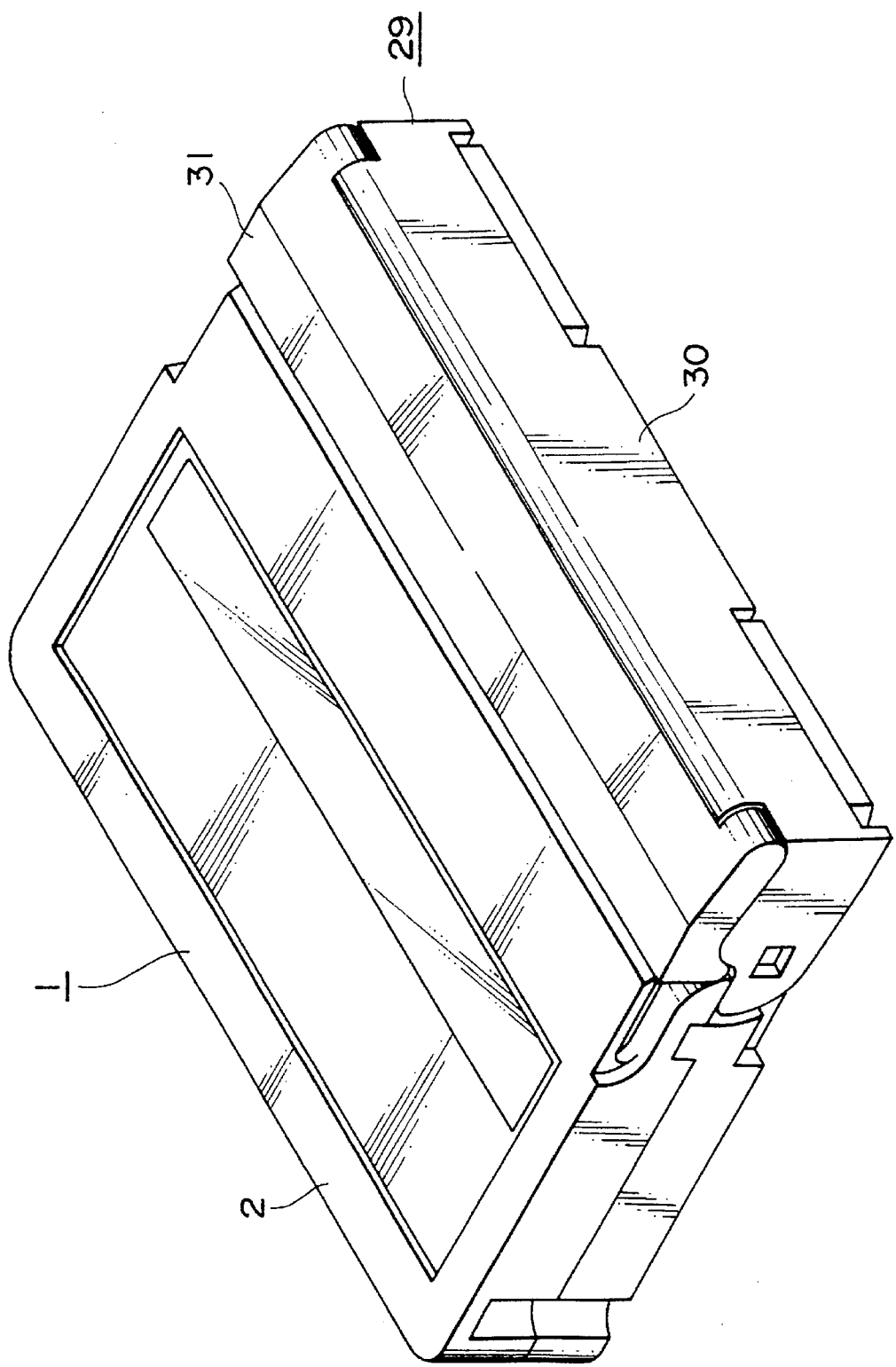
FIG. 1 a perspective view of a tape cassette for use with a recording/reproducing device according to the present invention.
Figure 2:
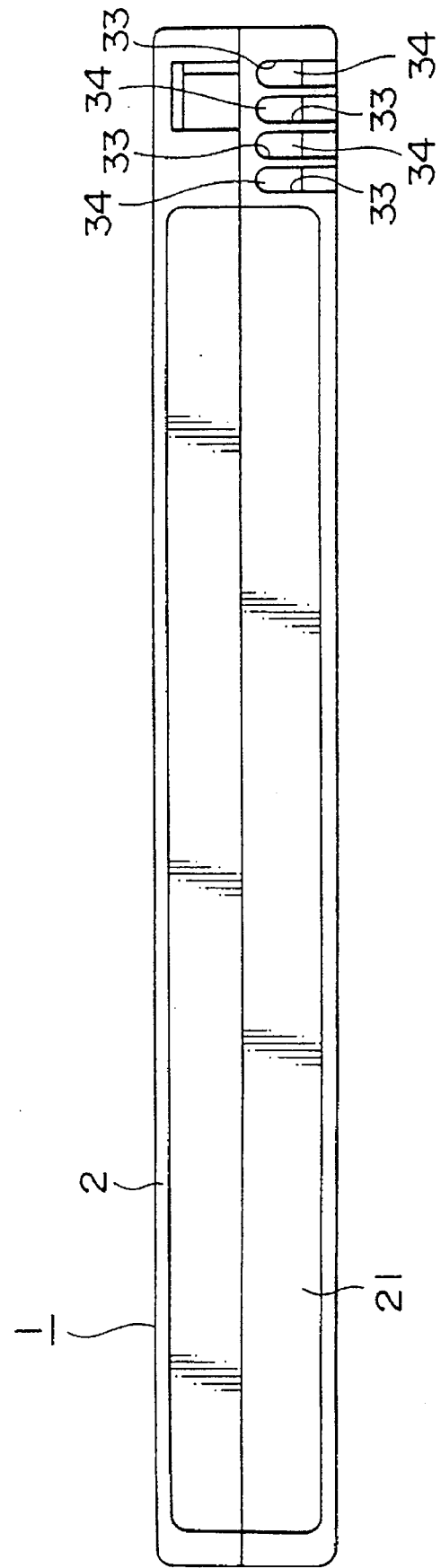
FIG. 2 is a rear elevation of the tape cassette shown in FIG. 1.
Figure 3:
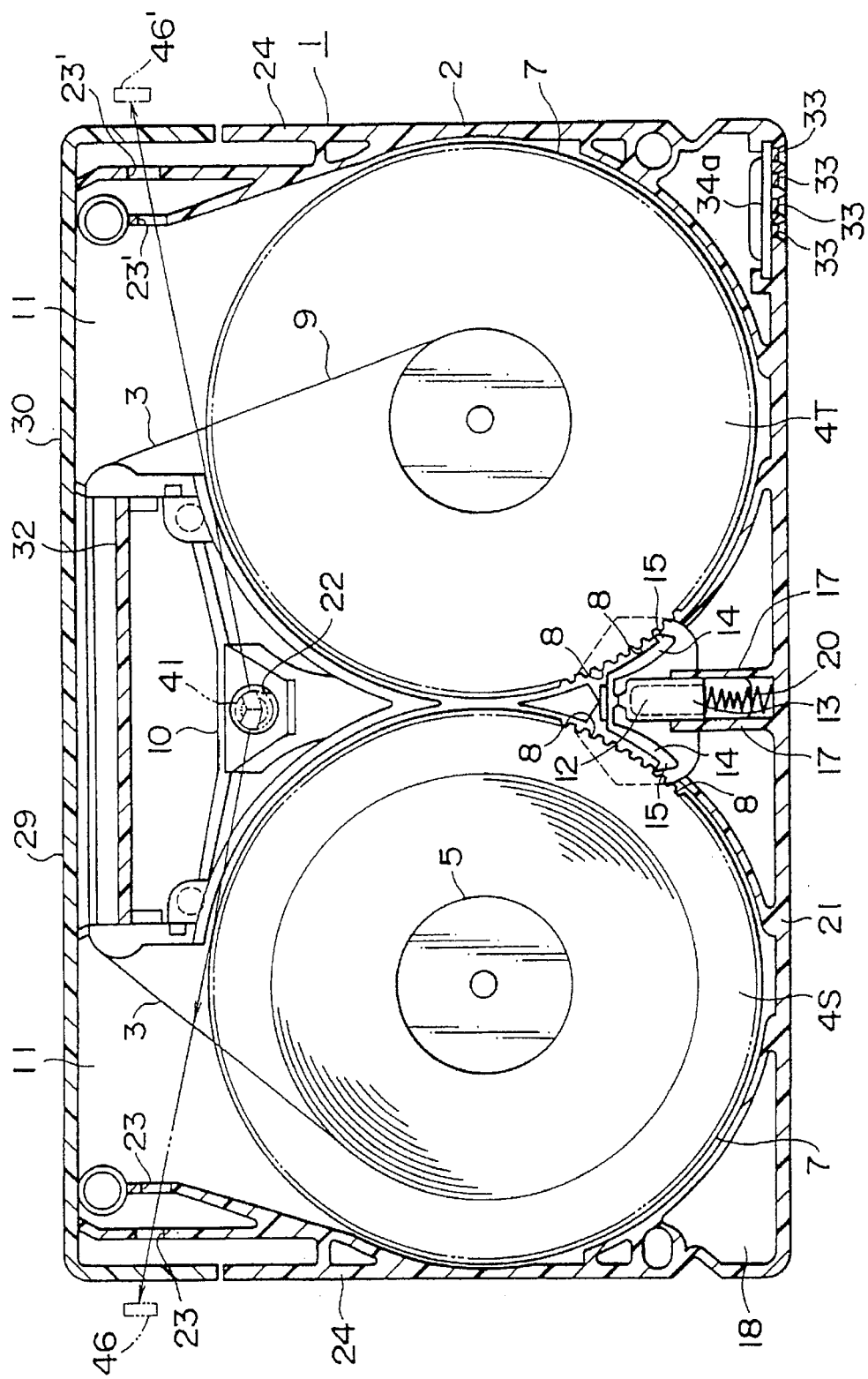
FIG. 3 is a horizontal sectional view of the tape cassette shown in FIG. 1.
Figure 4:
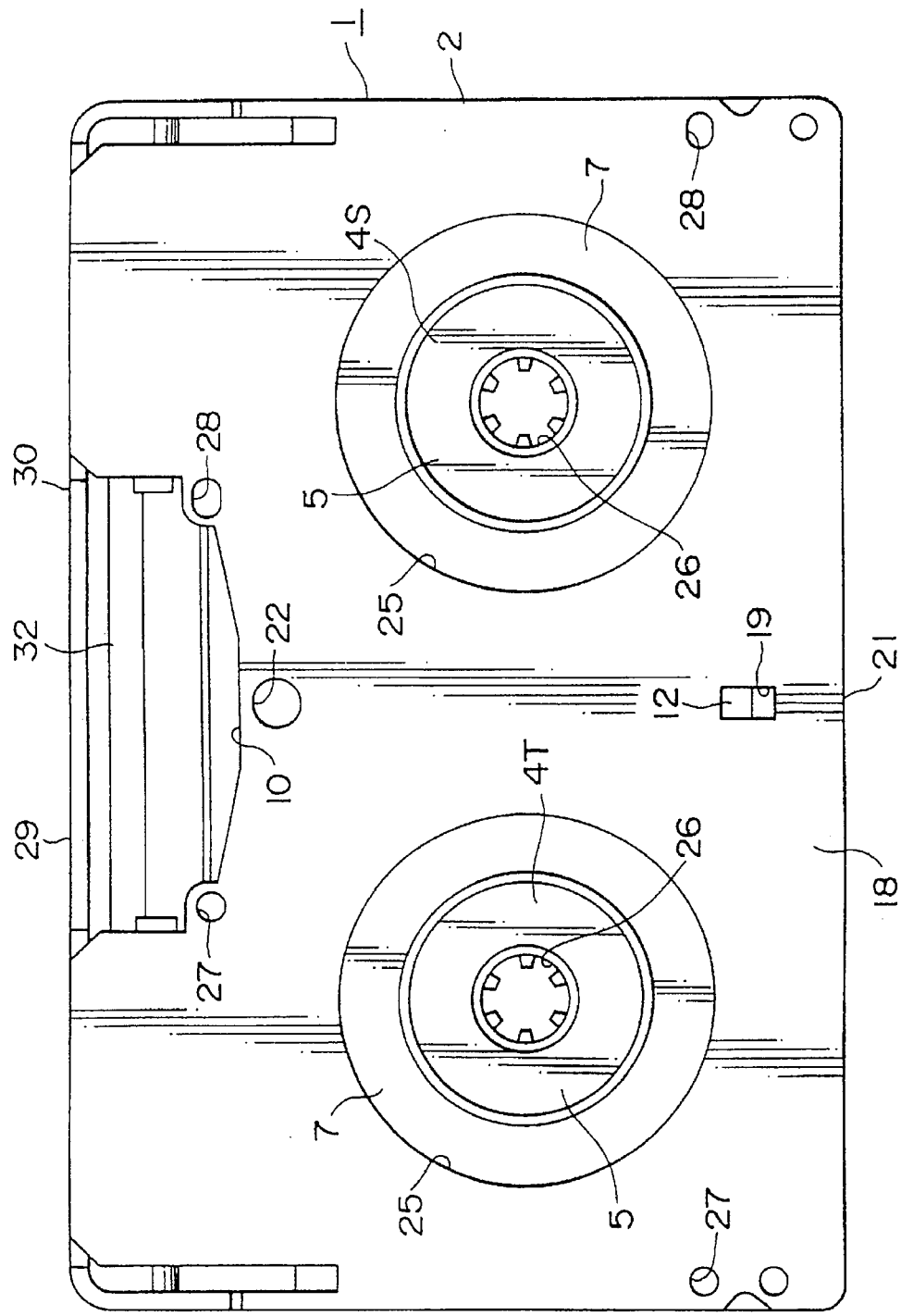
FIG. 4 is a bottom plan view of the tape cassette shown in FIG. 1.

A preferred embodiment of the recording/reproducing device according to the present invention will now be described with reference to the drawings.

First, a tape cassette for use with the recording/reproducing device according to the present invention will be described.

Referring to FIGS. 1 to 5, there is shown a tape cassette 1. The tape cassette 1 includes a substantially box-like cassette case 2, a pair of left and right tape reels 4S and 4T rotatably provided in the cassette case 2, and a magnetic tape 3 wound around the tape reels 4S and 4T. The cassette case 2 has a rectangular shape elongated in the transverse direction as viewed in plan and is flattened so as to have a small thickness. The tape reel 4S is a supply reel, and the tape reel 4T is a take-up reel.

Each of the tape reels 4S and 4T is composed of a reel hub 5 and two flanges 6 and 7 fixed to the upper and lower ends of the reel hub 5. A plurality of teeth 8 are formed on the outer circumference of each lower flange 7. Both ends of the magnetic tape 3 are fixedly attached through leader-trailer tapes 9 to both reel hubs 5.

A recess 10 as a mouth portion is formed at a laterally central, front portion of the cassette case 2 so as to open to both the front side and the upper and lower sides of the cassette case 2. The recess 10 is an area into which a tape drawing member provided in the recording/reproducing device is inserted when the tape cassette 1 is loaded to a given cassette loading position in the recording/reproducing device.

Two tape outlets 11 are formed on the right and left sides of the mouth portion 10 formed at the front portion of the cassette case 2. A part of the magnetic tape 3 is led out of the cassette case 2 from the tape outlets 11 in an operative condition of the tape cassette 1, whereas being disposed along the front face of the mouth portion 10 in an inoperative condition of the tape cassette 1.

A reel lock member 12 is located at a rear portion of the cassette case 2 between the tape reels 4S and 4T. The reel lock member 12 is integrally formed of an elastic synthetic resin. The reel lock member 12 is composed of a main portion 13 having a substantially prismatic shape and a pair of arms 14 connected to the front end of the main portion 13 and projecting obliquely rearward. A pawl 15 is formed at a free end of each arm 14 so as to project outward.

The main portion 13 is formed with a hollow portion 16 opening downward. A lower end portion 16a of the rear surface of the hollow portion 16 is formed as an inclined surface inclined upward to the front side.

A pair of guide walls 17 project upward from a bottom wall 18 of the cassette case 2. The guide walls 17 are located at a rear end portion of the bottom wall 18 at a transversely central position thereof in such a manner as to be spaced in the transverse direction and extend in parallel in the longitudinal direction of the cassette case 2. A through hole 19 is formed at a substantially front half of a portion of the bottom wall 18 defined between the two guide walls 17. A rear edge portion 19a of the through hole 19 is inclined upward to the front side.

The reel lock member 12 is supported in the cassette case 2 in such a manner that the main portion 13 is disposed between the guide walls 17 and is slidable in the longitudinal direction as guided by the guide walls 17.

A coil spring 20 is interposed under compression between the rear end surface of the main portion 13 of the reel lock member 12 and a rear wall 21 of the cassette case 2 in the space defined between the guide walls 17. The reel lock member 12 is normally biased by an elastic force of the coil spring 20 directed frontward. Accordingly, unless the reel lock member 12 is pressed rearward against the biasing force of the coil spring 20, the frontward movement of the reel lock member 12 is stopped by the engagement of the pawls 15 with the teeth 8 of the tape reels 4S and 4T, whereby the tape reels 4S and 4T are locked.

A through hole 22 is formed through the bottom wall 18 of the cassette case 2 at a position just behind a transversely central portion of the rear surface of the mouth portion 10. A light emitting portion of a tape end sensor to be hereinafter described is inserted through the through hole 22.

A pair of light transmitting windows 23 and 23' are formed through left and right side walls 24 of the cassette case 2 at positions near the front ends of the side walls 24. A light receiving portion of the tape end sensor to be hereinafter described is exposed from the outside of the cassette case 2 through the light transmitting windows 23 and 23' to the inside of the cassette case 2.

A pair of left and right exposure holes 25 are formed through the bottom wall 18 of the cassette case 2 at positions corresponding to the tape reels 4S and 4T. A pair of reel table engaging holes 26 are formed in the reel hubs 5 of the tape reels 4S and 4T so as to open downward. The reel table engaging holes 26 of the reel hubs 5 are exposed through the exposure holes 25 of the bottom wall 18 to the outside of the cassette case 2.

Four positioning holes 27 and 28 are formed through the bottom wall 18 of the cassette case 2. The two positioning holes 27 are circular, and the other two positioning holes 28 are oval so as to be elongated in the transverse direction.

A lid member 29 is pivotably supported to a front end portion of the cassette case 2. The lid member 29 is composed of a front lid 30 for openably closing the front face of the cassette case 2, a top lid 31 pivotably supported to the front lid 30 for openably closing the upper face of the mouth portion 10 and a front end portion of the upper face of the cassette case 2, and a back lid 32 pivotably supported to the top lid 31 for openably covering the rear surface of the magnetic tape 3 stretched in the mouth portion 10.

A plurality of vertically elongated, thin exposure windows 33 are formed through the rear wall 21 of the cassette case 2 at a position near the right end thereof. A plurality of terminals 34 are exposed through the exposure windows 33 to the outside of the cassette case 2. The terminals 34 are formed on a substrate 34a mounted in the cassette case 2. For example, the terminals 34 are connected to an IC mounted on the substrate 34a, so as to transmit to the recording/reproducing device various kinds of information including the kind of the magnetic tape 3, the permission or inhibition of recording, and the kind of recorded contents.

There will now be described a recording/reproducing device 35 according to the present invention.

Figure 5:
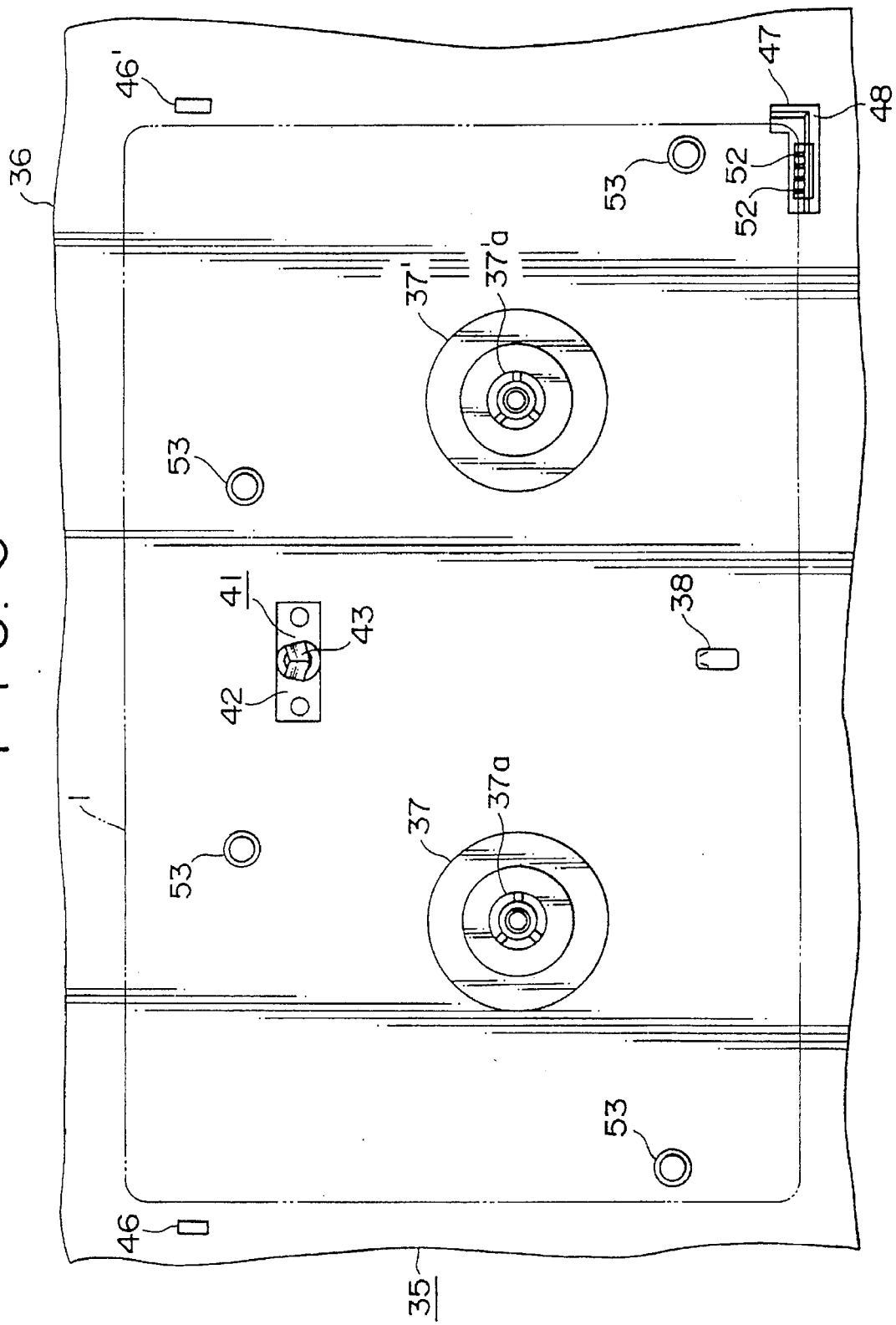
FIG. 5 is a schematic top plan view of a chassis of the recording/reproducing device according to the present invention.
Figure 6:
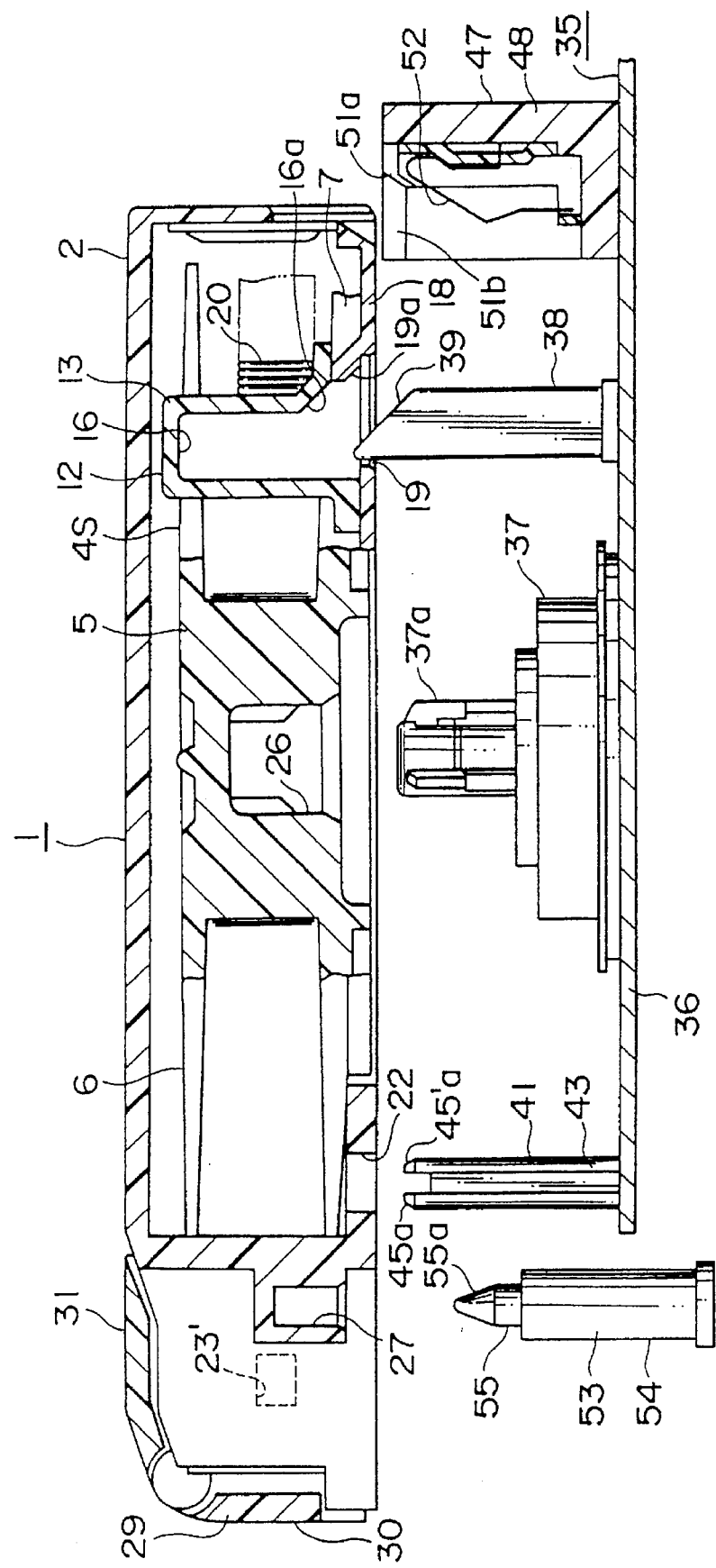
FIG. 6 is a schematic vertical sectional view showing a condition where the tape cassette is present considerably over a cassette loading position during the course of loading of the tape cassette to the cassette loading position.

As shown in FIG. 5, the recording/reproducing device 35 includes a chassis 36. A pair of reel tables 37 and 37', a head drum (not shown), etc. are mounted on the chassis 36.

Although not shown, a cassette holder (as disclosed in U.S. Pat. No. 5,331,482, for example) is vertically movably mounted on the chassis 36. When the cassette holder is in a raised position with respect to the chassis 36, the tape cassette 1 is received by the cassette holder, whereas when the cassette holder having received the tape cassette 1 is lowered to a given cassette loading position, the tape cassette 1 is loaded in this position.

A reel lock release member 38 for releasing the locked condition of the tape reels 4S and 4T established by the reel lock member 12 is provided so as to stand on the upper surface of the chassis 36 at a transversely central position near a rear end portion thereof.

Figure 10:
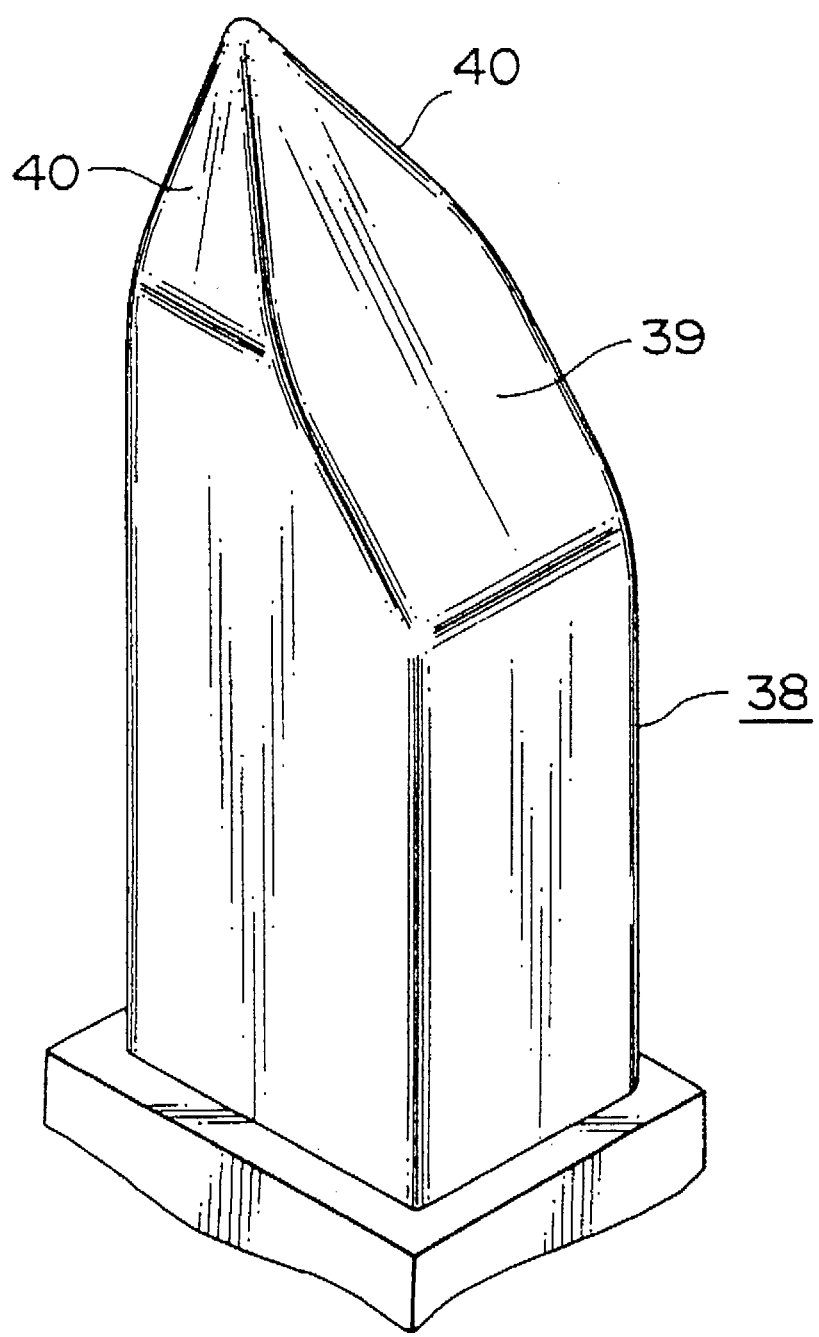
FIG. 10 is an enlarged perspective view of a reel lock release member.

The reel lock release member 38 is a thick plate-like member, and it is provided on the chassis 36 in such a manner that both side surfaces thereof are oriented in the transverse direction of the chassis 36. As shown in FIG. 10, a rear surface 39 of an upper end portion of the reel lock release member 38 is formed as an inclined surface inclined upward to the front side, and both side surfaces 40 at the upper end portion of the reel lock release member 38 are formed as leading surfaces inclined so as to approach each other toward the top. The transverse size of the reel lock release member 38 is set slightly smaller than the transverse size of the through hole 19 formed through the bottom wall 18 of the cassette case 2. Further, the longitudinal size of the reel lock release member 38 is set smaller than the longitudinal size of the through hole 19.

Figure 7:
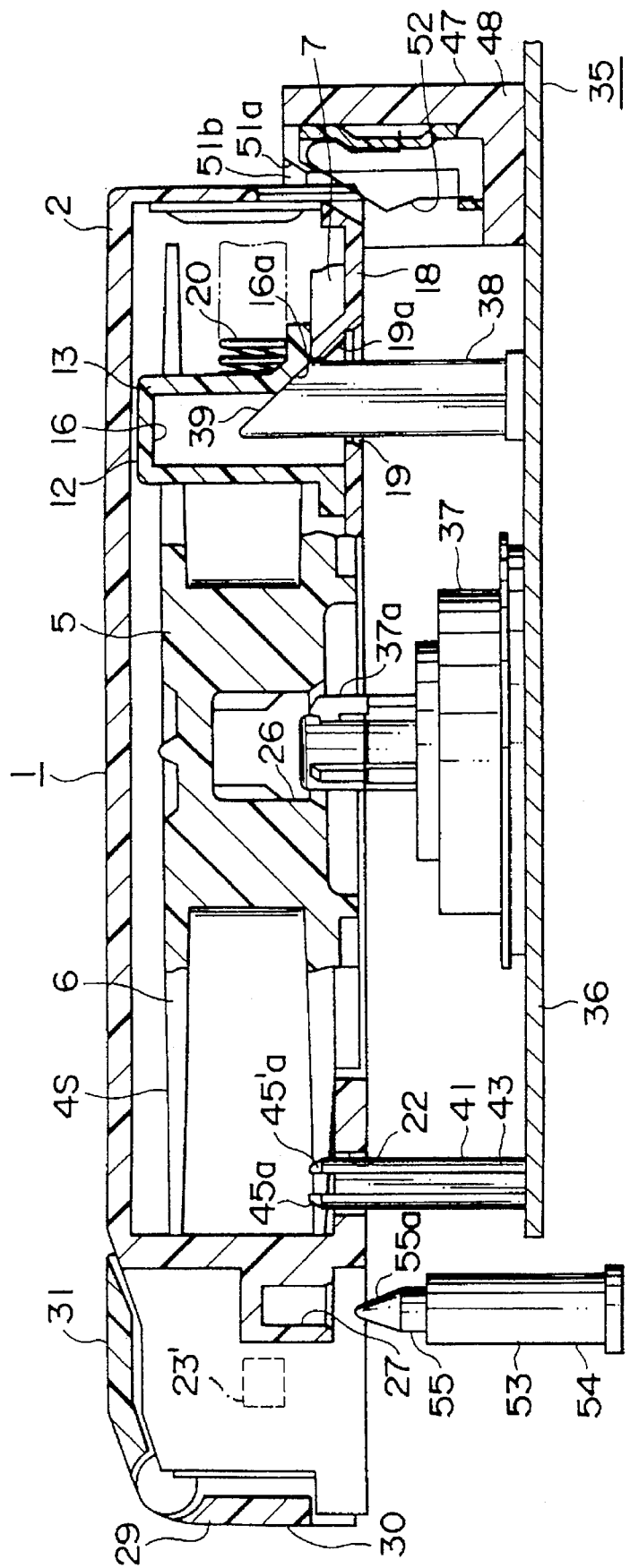
FIG. 7 is a view similar to FIG. 6, showing a condition where the tape cassette is just lowered from the condition shown in FIG. 6.
Figure 8:
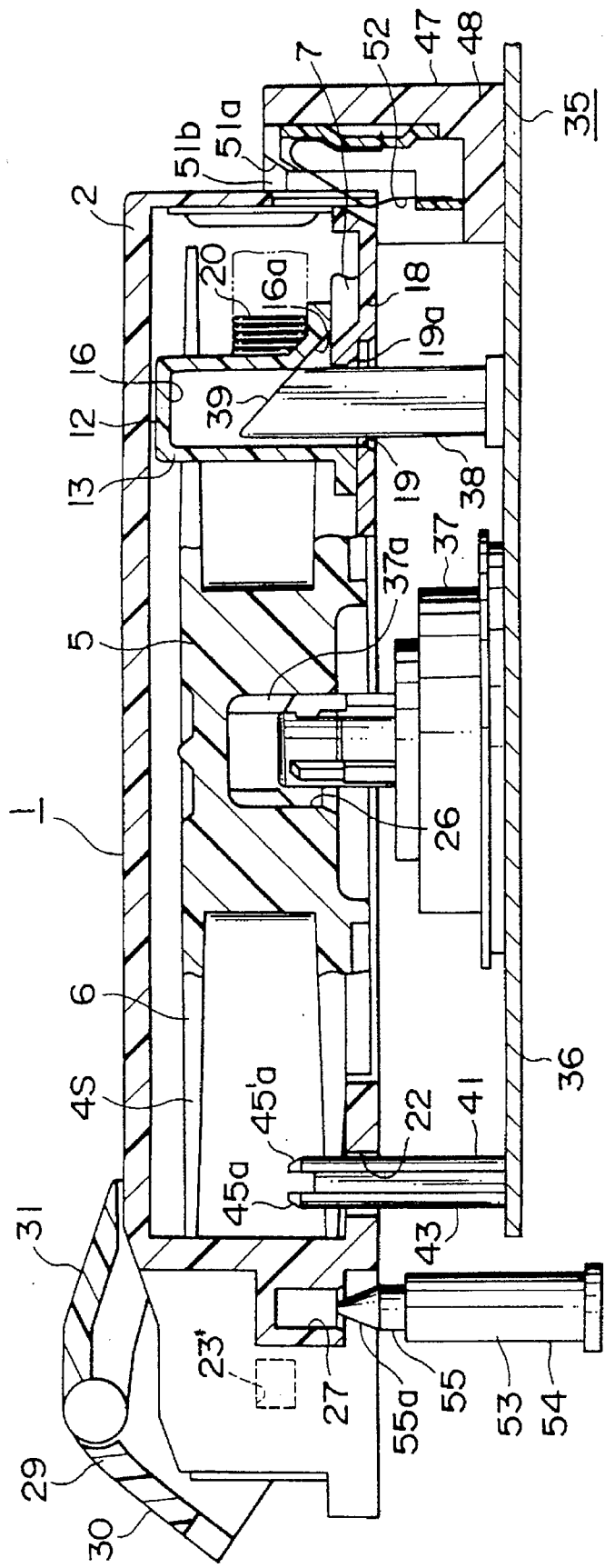
FIG. 8 is a view similar to FIG. 6, showing a condition where the tape cassette is further lowered from the condition shown in FIG. 7.

When the tape cassette 1 held in the cassette holder is lowered to the cassette loading position, the reel lock release member 38 is inserted from the through hole 19 into the cassette case 2, then entering the hollow portion 16 of the reel lock member 12. During the entry of the reel lock release member 38 into the hollow portion 16, the inclined surface 39 of the reel lock release member 38 first comes into contact with the inclined surface 16a of the hollow portion 16 (see FIG. 7). Thereafter, the inclined surface 39 presses the inclined surface 16a of the hollow portion 16 in the rearward direction (see FIG. 8), thereby rearward moving the reel lock member 12 against the biasing force of the coil spring 20. Accordingly, the pawls 15 of the reel lock member 12 are disengaged from the teeth 8 of the tape reels 4S and 4T, thereby releasing the locked condition of the tape reels 4S and 4T.

At the same time, approximate positioning of the tape cassette 1 in the transverse direction is carried out by the insertion of the reel lock release member 38 into the through hole 19. More specifically, even if the tape cassette 1 is somewhat transversely shifted in position at starting of its downward movement (see FIG. 11A), either a right or left inside surface 19b of the through hole 19 comes into contact with either the right or left leading surface 40 of the reel lock release member 38 (see FIG. 11B). When the reel lock release member 38 further relatively rises, either the right or left leading surface 40 contacting with either the right or left inside surface 19b sideward urges the corresponding inside surface 19b to sideward move the tape cassette 1, thereby allowing the insertion of the reel lock release member 38 into the through hole 19 (see FIG. 11C). Thus, until either the right or left inside surface 19b of the through hole 19 comes into contact with either the right or left side surface of the reel lock release member 38, the tape cassette 1 is allowed to move rightward or leftward, thereby approximately positioning the tape cassette 1 in the transverse direction.

Figure 11A:
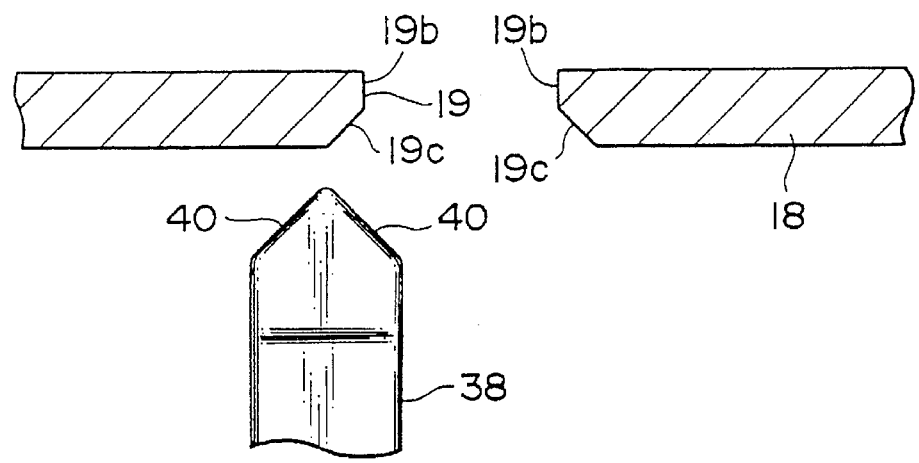
FIGS. 11A, 11B, and 11C are schematic vertical sectional views showing the course of insertion of the reel lock release member into a cassette case.
Figure 11B:
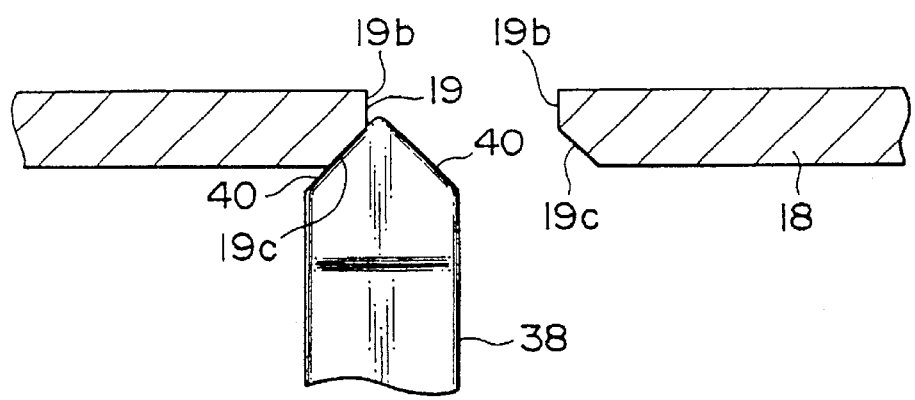
Figure 11C:
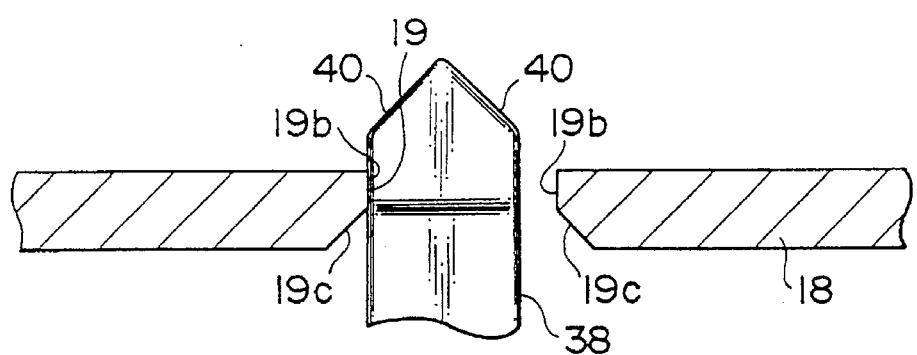
Figure 12:
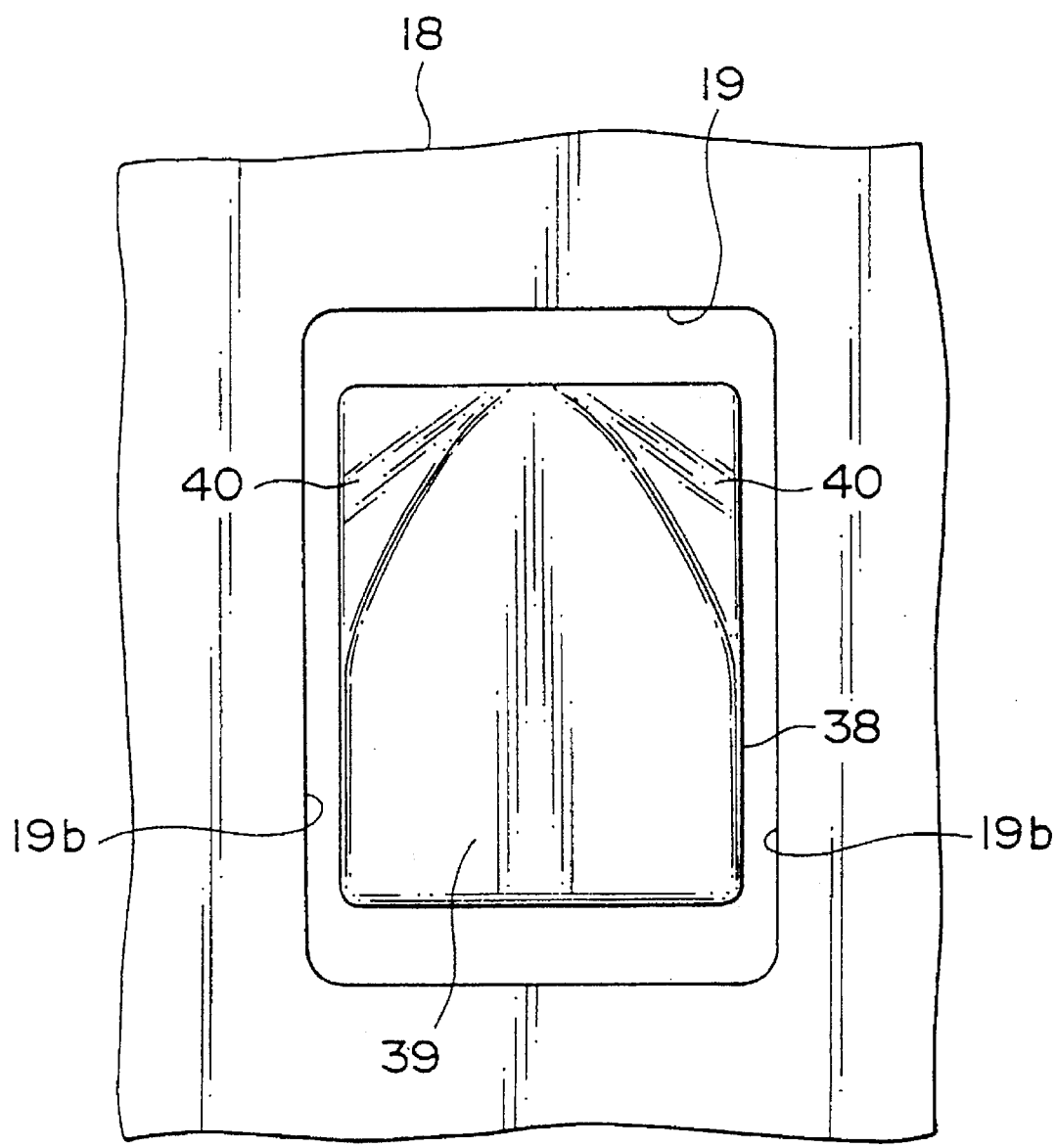
FIG. 12 is an enlarged top plan view of an essential part, showing a condition where the reel lock release member is inserted into the cassette case.
Figure 13:
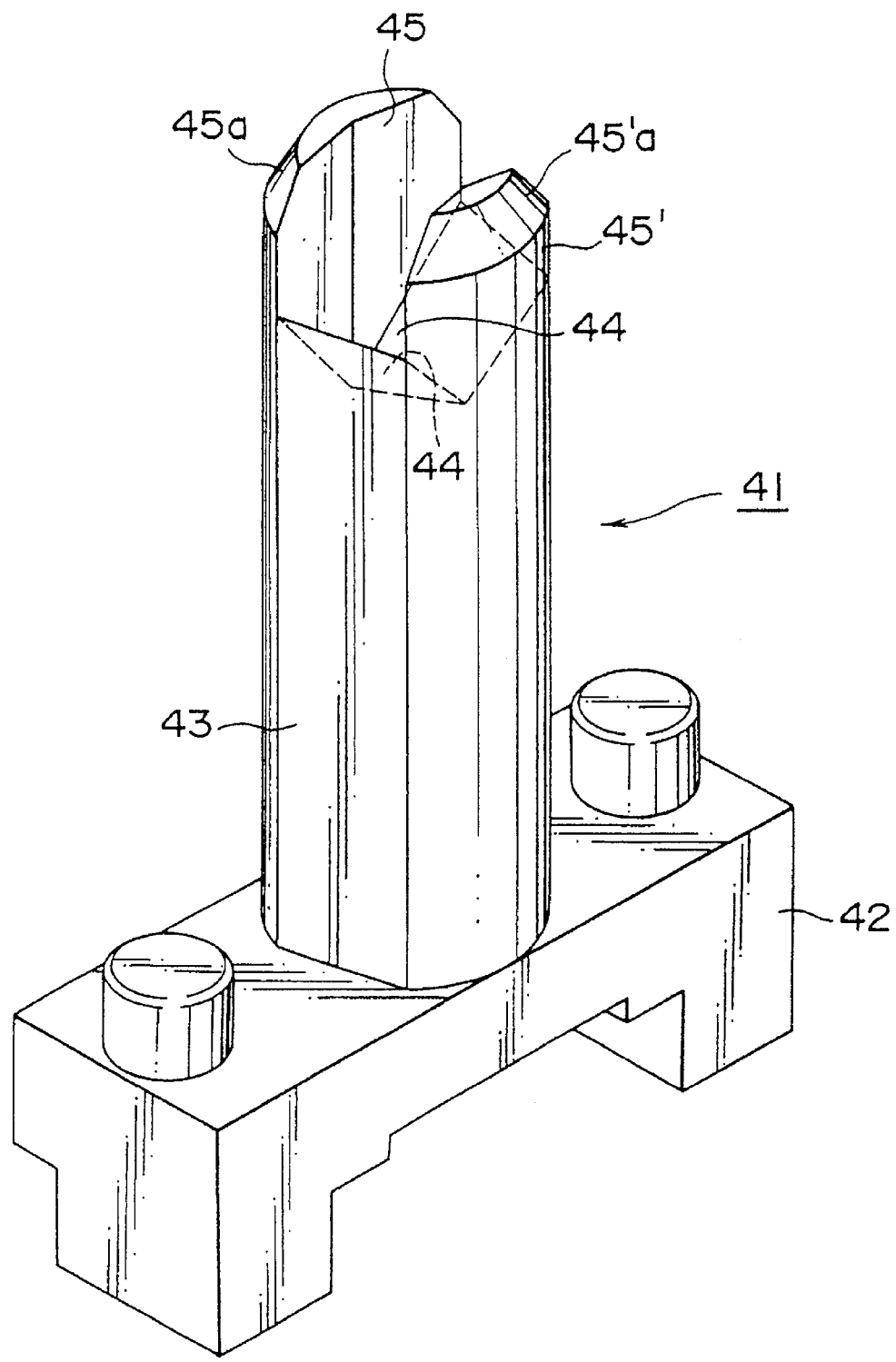
FIG. 13 is an enlarged perspective view of a light emitting portion of tape end detecting means.
Figure 14:
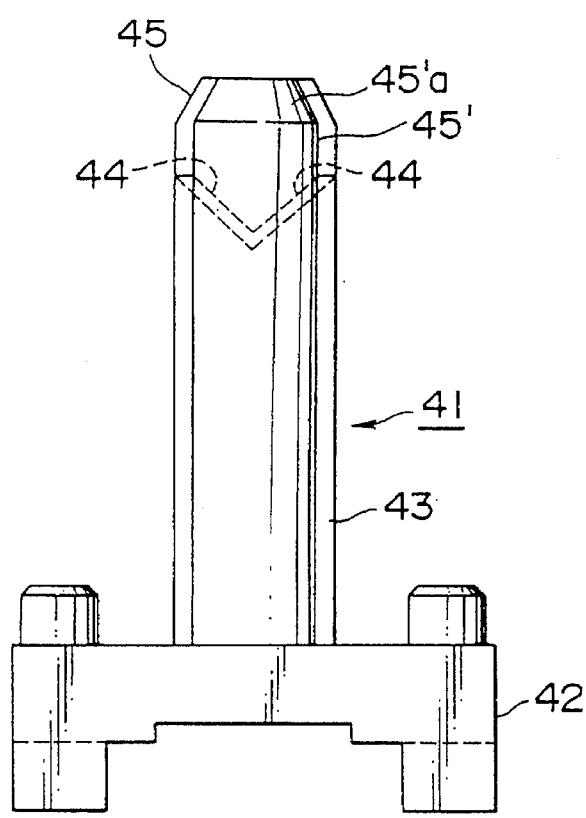
FIG. 14 is a front elevation of the light emitting portion shown in FIG. 13.
Figure 15:
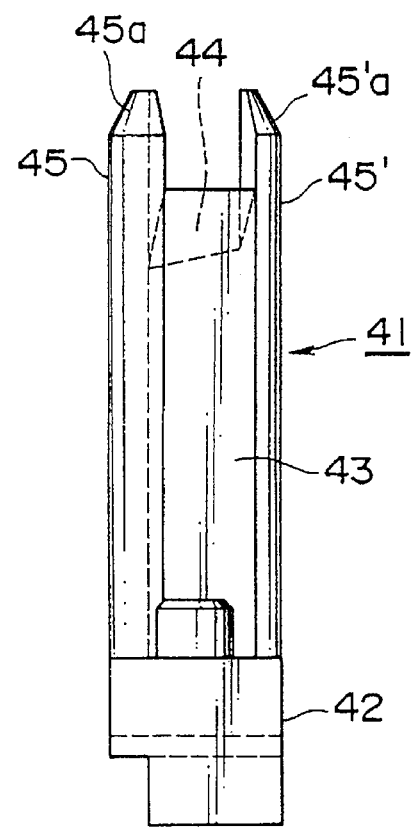
FIG. 15 is a side elevation of the light emitting portion shown in FIG. 13.
Figure 16:
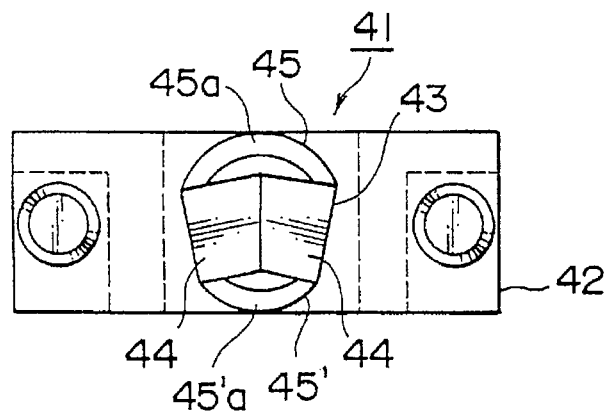
FIG. 16 is a top plan view of the light emitting portion shown in FIG. 13.
Figure 17:
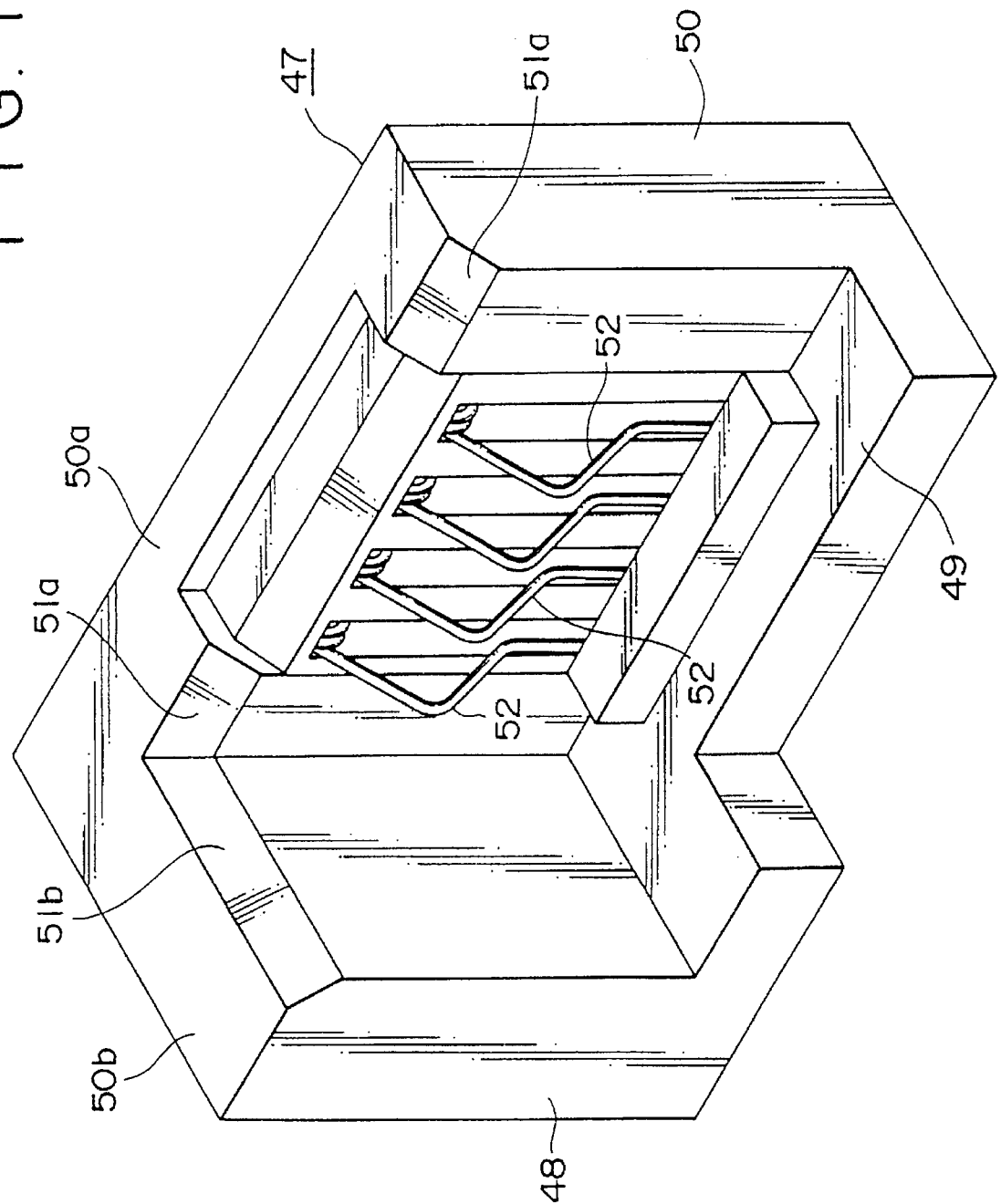
FIG. 17 is an enlarged perspective view of a connector of cassette information detecting means for detecting information regarding the tape cassette.
Figure 18A:
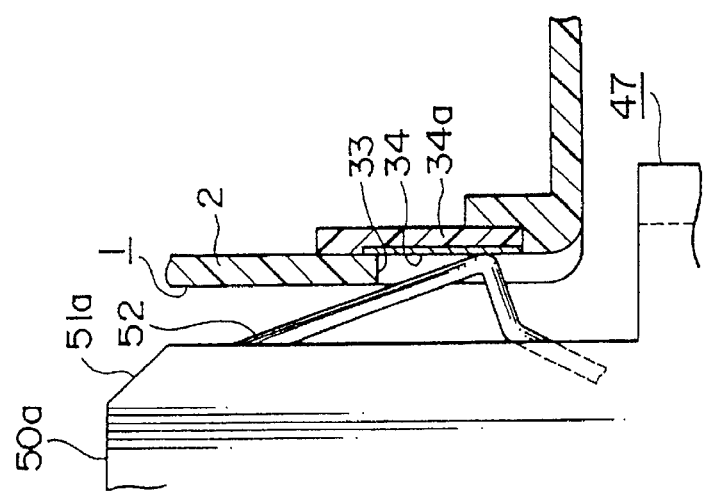
FIGS. 18A, 18B, and 18C are schematic vertical sectional views of an essential part, showing the course of correction of misalignment of the tape cassette by means of the connector.
Figure 18B:
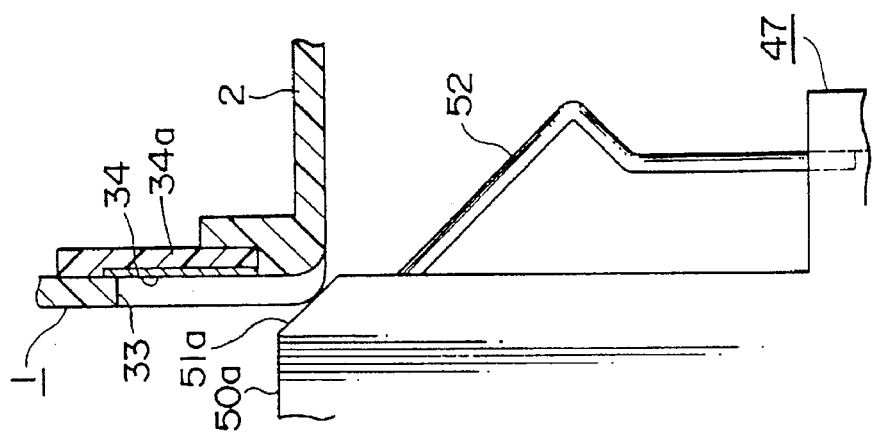
Figure 18C:
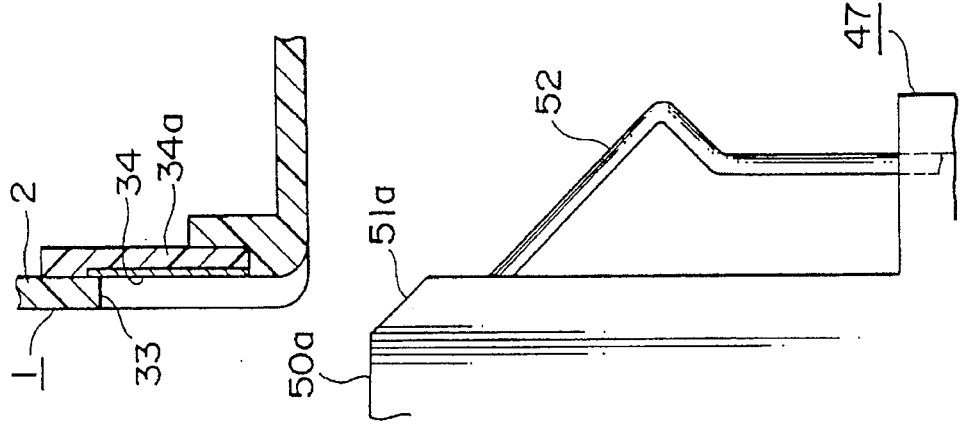

Preferably, as shown in FIGS. 11A to 11C, the lower edge 19c of each inside surface 19b of the through hole 19 is formed as an inclined surface inclined outward to the lower side, whereby the range of contact between either inside surface 19b of the through hole 19 and either leading surface 40 of the reel lock release member 38 on the same side can be made wide to thereby cope with a large degree of transverse misalignment of the tape cassette 1. Accordingly, a dimensional tolerance in designing can be made large to thereby increase a degree of freedom in designing.

A light emitting portion 41 of tape end detecting means is fixedly mounted on the chassis 36. The light emitting portion 41 is composed of a base portion 42 fixed to the lower surface of the chassis 36 at a transversely central, front end portion thereof and a columnar light guide portion 43 projecting upward from the upper surface of the base portion 42. The light guide portion 43 is formed of a transparent material such as transparent plastics. A light emitting element (not shown) is provided in the base portion 42, and light emitted from the light emitting element is adapted to advance through the light guide portion 43 to the upper end thereof.

The upper end of the light guide portion 43 except its front and rear ends is cut into a V-shape to form a pair of inclined surfaces 44. Each inclined surface 44 is oriented sideward and slightly frontward, and the angle of inclination of each inclined surface 44 as viewed in front elevation is set to about 45 degrees with respect to a horizontal plane. That is, when the tape cassette 1 is loaded to the given cassette loading position where the light guide portion 43 is inserted through the through hole 22 into the cassette case 2, the inclined surfaces 44 of the light guide portion 43 are opposed at an inclination angle of about 45 degrees to the light transmitting windows 23 and 23' formed through the side walls 24 of the cassette case 2.

Of the upper end portion of the light guide portion 43, the outer edges of remaining portions 45 and 45' left by V-shaped cutting are chamfered to form a pair of inclined surfaces 45a and 45'a.

The longitudinal size of the light guide portion 43 (i.e., the size in the longitudinal direction of the chassis 36) is set slightly smaller than the longitudinal size of the through hole 22 formed through the bottom wall 18 of the cassette case 2.

When the tape cassette 1 held in the cassette holder (as disclosed in U.S. Pat. No. 5,331,482, for example) is lowered toward the cassette loading position, the light guide portion 43 of the light emitting portion 41 of the tape end detecting means is inserted from the through hole 22 formed through the bottom wall 18 of the cassette case 2 into the cassette case 2. In this condition where the light guide portion 43 is inserted into the cassette case 2, the inclined surfaces 44 of the light guide portion 43 are opposed at an inclination angle of about 45 degrees to the light transmitting windows 23 and 23'.

Accordingly, the light emitted from the light emitting element in the base portion 42 is transmitted upward in the light guide portion 43 to the inclined surfaces 44. Then, the light is reflected on the inclined surfaces 44 to advance toward the light transmitting windows 23 and 23'. A pair of light receiving portions 46 and 46' of the tape end detecting means are mounted on the chassis 36 at positions opposed to the light transmitting windows 23 and 23' from the outside of the cassette case 2. Accordingly, the light transmitted through the light transmitting windows 23 and 23' is received by the light receiving portions 46 and 46', respectively.

Accordingly, when either the tape reel 4S or the tape reel 4T becomes a condition of tape end where one of the leader-trailer tapes 9 attached to both ends of the magnetic tape 3 is present between one of the inclined surfaces 44 and one of the light transmitting windows 23 and 23', the light reflected on either inclined surface 44 is passed through either transparent leader-trailer tape 9 and either light transmitting window 23 or 23' and is received by either light receiving portion 46 or 46', thus detecting the tape end.

Even if the tape cassette 1 is somewhat longitudinally shifted in position in the cassette holder prior to insertion of the upper end portion of the light guide portion 43 of the light emitting portion 41 into the through hole 22, one of the front and rear inclined surfaces 45a and 45'a of the light guide portion 43 first comes into contact with the opening edge of the through hole 22 (more specifically, when the tape cassette 1 is shifted rearward, the front inclined surface 45a comes into contact with the front portion of the opening edge, whereas when the tape cassette 1 is shifted frontward, the rear inclined surface 45'a comes into contact with the rear portion of the opening edge). When the tape cassette 1 is further lowered, the light guide portion 43 is relatively raised to thereby let the inclined surface 45a or 45'a urge the opening edge of the through hole 22, thereby moving the tape cassette 1 frontward or rearward. Thus, the longitudinal misalignment of the tape cassette 1 can be corrected.

A connector 47 for cassette information reading is provided on the chassis 36 at a right, rear end portion thereof.

The connector 47 includes a holder 48 and a plurality of contacts 52 supported to the holder 48. The holder 48 is formed of an insulating material such as a synthetic resin. The holder 48 is composed of a base portion 49 and a vertical wall 50 standing from the base portion 49. The vertical wall 50 is composed of a rear portion 50a and a side portion 50b joined together so as to be configured in an L-shape as viewed in plan. The front edge of the upper surface of the rear portion 50a and the left edge of the upper surface of the side portion 50b are chafered to respectively form inclined surfaces 51a and 51b facing upward and inward of the holder 48.

The contacts 52 are formed of a conductive material having elasticity. The contacts 52 are connected to a reading portion not shown.

When the tape cassette 1 is loaded to the given cassette loading position, the contacts 52 of the connector 47 individually come into contact with the terminals 34 of the tape cassette 1, thereby allowing the reading portion to read cassette information, i.e., various kinds of information regarding the tape cassette 1.

If the tape cassette 1 is somewhat shifted in position in the longitudinal direction and/or the transverse direction at starting of the downward movement to the cassette loading position, the rear edge and/or the side edge of the rear right corner of the bottom of the cassette case 2 first comes into contact with the inclined surface 51a and/or the inclined surface 51b of the holder 48 by the downward movement of the tape cassette 1.

When the tape cassette 1 is further lowered, the rear edge and/or the side edge slips on the inclined surface 51a and/or the inclined surface 51b to thereby move the tape cassette 1 frontward and/or sideward. Thus, the longitudinal and/or transverse misalignment of the tape cassette 1 can be corrected.

A plurality of positioning pins 53 project upward from the chassis 36 at positions corresponding to the positioning holes 27 and 28 of the tape cassette 1.

Each positioning pin 53 is composed of a circular columnar main portion 54 and a head portion 55 projecting from the upper end surface of the main portion 54. The outer diameter of the head portion 55 is set smaller than the outer diameter of the main portion 54, substantially the same as or slightly smaller than the inner diameter of each circular positioning hole 27 of the tape cassette 1, and substantially the same as or slightly smaller than the longitudinal size of each oval positioning hole 28. Further, an upper part 55a of the head portion 55 is circular conical except its lower end part.

In the final stage of loading of the tape cassette 1 to the cassette loading position after performing approximate positioning of the tape cassette 1 in the cassette holder in the longitudinal direction and the transverse direction, the head portions 55 of the positioning pins 53 are inserted into the positioning holes 27 and 28 to thereby perform final positioning of the tape cassette 1 to the cassette loading position. At this time, even if there is yet slight misalignment of the tape cassette 1, the conical surfaces of the circular conical parts 55a of the head portions 55 of the positioning pins 53 come into contact with the opening edges of the positioning holes 27 and 28 to thereby urge the opening edges and lead the tape cassette 1 to the proper position.

Further, when the tape cassette 1 is loaded to the cassette loading position, a pair of reel engaging shafts 37a and 37'a of the reel tables 37 and 37' come into engagement with the reel table engaging holes 26 of the tape reels 4S and 4T.

In the recording/reproducing device 35 mentioned above, the tape cassette 1 held in the cassette holder is approximately positioned by the insertion of the reel lock release member 38 into the through hole 19, the insertion of the light guide portion 43 of the light emitting portion 41 of the tape end detecting means into the through hole 22, and the contact between the holder 48 of the connector 47 and a part of the cassette case 2 during the downward movement of the tape cassette 1 to the cassette loading position. At the final stage where the tape cassette 1 is finally loaded to the cassette loading position, the head portions 55 of the positioning pins 53 are securely inserted into the positioning holes 27 and 28.

Accordingly, even if positioning of the tape cassette 1 inserted into the cassette holder is rough, approximate positioning of the tape cassette 1 is performed during the course until the tape cassette 1 is finally positioned. Therefore, it is unnecessary to make so severe the designing and manufacturing accuracies of the cassette holder, thereby increasing a degree of freedom in designing and manufacturing.

Figure 9:
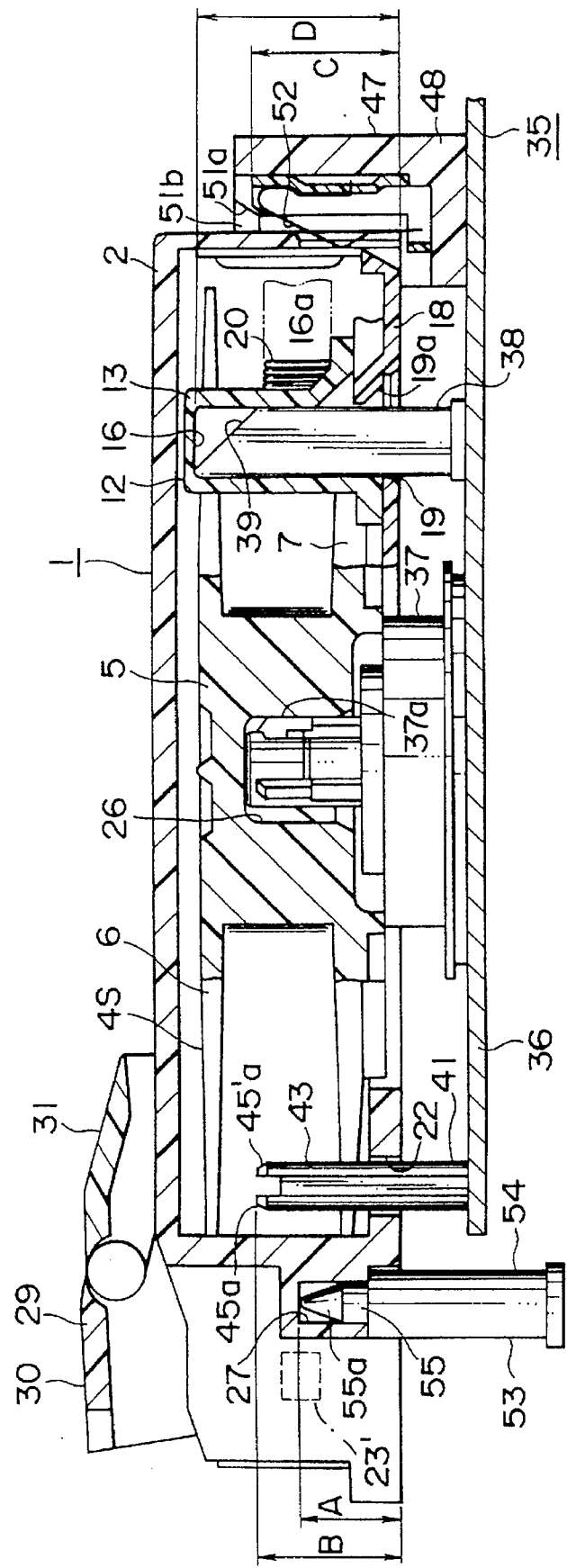
FIG. 9 is a view similar to FIG. 6, showing a condition where the tape cassette is further lowered from the condition shown in FIG. 8 to reach the cassette loading position.

As shown in FIG. 9, the amounts of insertion of each positioning pin 53, the reel lock release member 38, the light guide portion 43, and the connector 47 into the tape cassette 1 are denoted by A, D, B, and C, respectively. The positioning pins 53 correspond to the first positioning means according to the present invention, and the reel lock release member 38, the light guide portion 43, and the connector 47 correspond to the second positioning means according to the present invention. The relation between these insertion amounts is set to A<B<C<D.

Although the approximate positioning of the tape cassette 1 in the cassette holder is effected by using the reel lock release member 38, the light guide portion 43 of the light emitting portion 41 of the tape end detecting means, and the holder 48 of the connector 47 in combination in the above preferred embodiment, one of these components may be independently used, or two of these components may be used in combination. Alternatively, at least one of these components may be used in combination with any other member or members capable of approximately positioning the tape cassette 1.

It is to be noted that the shape and structure of each portion mentioned in the above preferred embodiment are merely illustrative in embodying the present invention, and the scope of the present invention is not construed as restrictive to the above preferred embodiment.

What is claimed is:

1. A tape cassette loading device comprising:

cassette holder means for holding a tape cassette and moving said tape cassette to a cassette loading position;

first positioning means adapted to be inserted into a positioning hole formed in said tape cassette, for finally positioning said tape cassette; and second positioning means for approximately positioning said tape cassette during movement of said tape cassette to said cassette loading position prior to final positioning by said first positioning means, said second positioning means including a body portion and a guide portion formed at an upper end of said body portion, said body portion having substantially the same shape as that of at least one of an opening portion formed at a given position on a lower surface of said tape cassette and an end portion of said lower surface of said tape cassette, and wherein said second positioning means has a first inclined portion and a second inclined portion; and wherein before an upper end of said first positioning means enters a lower end of said positioning hole, said guide portion of said second positioning means comes into contact with at least one of said opening portion and said end portion of said lower surface of said tape cassette to approximately position said tape cassette with a side surface of said body portion of said second positioning means.

2. A tape cassette loading device according to claim 1, wherein said first inclined portion has an angle of inclination smaller than that of said second inclined portion with respect to said lower surface of said tape cassette, and said first inclined portion comes into contact with said opening portion before said second inclined portion comes into contact with said opening portion.

3. A tape cassette loading device according to claim 2, wherein a depth of insertion of said first positioning means into said tape cassette is set smaller than that of said second positioning means.

4. A tape cassette loading device according to claim 3, wherein said second positioning means comprises a reel lock release member for releasing a locked condition of tape reels in said tape cassette.

5. A tape cassette loading device according to claim 3, wherein said second positioning means comprises a part of tape end detecting means for detecting an end of a tape wound around tape reels in said tape cassette.

6. A tape cassette loading device according to claim 3, wherein said second positioning means comprises a part of cassette information detecting means for detecting cassette information including kinds and recorded contents of said tape cassette.

7. A tape cassette loading device according to claim 3, wherein said second positioning means comprises at least two of a reel lock release member for releasing a locked condition of tape reels in said tape cassette, a part of tape end detecting means for detecting an end of a tape wound around said tape reels, and a part of cassette information detecting means for detecting cassette information including kinds and recorded contents of said tape cassette.

8. A tape cassette adapted to be loaded into a tape cassette loading device having cassette holder means for moving said tape cassette to a given cassette loading position in said tape cassette loading device, said tape cassette comprising:

a first positioning portion for receiving first positioning means provided on said tape cassette loading device for finally positioning said tape cassette; and a second positioning portion for receiving second positioning means provided on said tape cassette loading device for approximately positioning said tape cassette during movement of said tape cassette to said cassette loading position prior to final positioning by said first positioning means, and wherein said second positioning means has a first inclined portion and a second inclined portion, and said first inclined portion and said second inclined portion are inserted in this order into said second positioning portion.

9. A tape cassette according to claim 8, wherein said first inclined portion has an angle of inclination smaller than that of said second inclined portion with respect to a lower surface of said tape cassette, and said first inclined portion comes into contact with said second positioning portion before said second inclined portion comes into contact with said second positioning portion.

10. A tape cassette loading device according to claim 9, wherein a depth of insertion of said first positioning means into said tape cassette is set smaller than that of said second positioning means.

11. A tape cassette loading device according to claim 10, wherein said second positioning means comprises a reel lock release member for releasing a locked condition of tape reels in said tape cassette.

12. A tape cassette loading device according to claim 10, wherein said second positioning means comprises a part of tape end detecting means for detecting an end of a tape wound around tape reels in said tape cassette.

13. A tape cassette loading device according to claim 10, wherein said second positioning means comprises a part of cassette information detecting means for detecting cassette information including kinds and recorded contents of said tape cassette.

14. A tape cassette loading device according to claim 10, wherein said second positioning means comprises at least two of a reel lock release member for releasing a locked condition of tape reels in said tape cassette, a part of tape end detecting means for detecting an end of a tape wound around said tape reels, and a part of cassette information detecting means for detecting cassette information including kinds and recorded contents of said tape cassette.

* * * * *